United States Patent [19]

Männl et al.

[11] Patent Number: 5,300,134
[45] Date of Patent: Apr. 5, 1994

[54] DEVICE AND PROCESS FOR DEFORMATION OF THE HEAT-SOFTENED END OF A GLASS TUBE

[75] Inventors: Reinhard Männl, Mitterteich; Alfons Wolfrum, Tirschenreuth; Franz Neumeier, Arzberg, all of Fed. Rep. of Germany

[73] Assignee: Schott Glaswerke, Mainz, Fed. Rep. of Germany

[21] Appl. No.: 62,029

[22] Filed: May 17, 1993

Related U.S. Application Data

[63] Continuation of Ser. No. 756,861, Sep. 11, 1991, abandoned.

[30] Foreign Application Priority Data

Sep. 11, 1990 [DE] Fed. Rep. of Germany ....... 4028824

[51] Int. Cl.[5] ............................................. C03B 23/09
[52] U.S. Cl. ...................................... 65/109; 65/277; 65/280; 65/282; 65/296
[58] Field of Search ................. 65/109, 277, 280, 282, 65/296

[56] References Cited

U.S. PATENT DOCUMENTS

| 4,080,189 | 3/1978 | Dichter | 65/280 |
| 4,830,654 | 5/1989 | Dichter | 65/280 |

FOREIGN PATENT DOCUMENTS

| 581053 | 8/1959 | Canada | 65/282 |
| 1093519 | 11/1960 | Fed. Rep. of Germany . | |
| 3405291 | 8/1985 | Fed. Rep. of Germany . | |

*Primary Examiner*—Joye L. Woodard
*Attorney, Agent, or Firm*—Millen, White, Zelano & Branigan

[57] ABSTRACT

An apparatus and process is provided for the deformation of the heat-softened end of a glass tube. In the formation of hollow articles such as, for example, vials from glass tubes, either large processing pauses occur or the formation elements have to be moved with high speed to the next tube being processed. To keep the processing pause short a forming roller is provided, which is shifted back and forth relative to the glass tube. Shifting of the forming roller takes place in such a manner that the forming roller, toward the end of the rolling, is at the starting position for forming the next glass tube.

16 Claims, 4 Drawing Sheets

DEVICE AND PROCESS FOR DEFORMATION OF THE HEAT-SOFTENED END OF A GLASS TUBE

This application is a continuation of application Ser. No. 07/756,861 filed Sep. 11, 1991, now abandoned.

BACKGROUND OF THE INVENTION

The invention relates to a device for deformation of the end area of a glass tube for forming a mouth area of a vial and to a process for forming a vial and the use of the device in a vial machine.

Many devices for the production of hollow articles such as vials, ampules, etc, from glass tube are known. Since these articles are mass-produced, low-cost and fast production is necessary.

DE-PS 12 61 638 describes a known device of this type, in which a ring of receiving devices rotates workpieces in the form of glass tubes in a workpiece path past at least one processing station. The processing station contains swiveling arms which carry forming parts. The forming parts are swung into the workpiece path and can form the workpieces on a section of the workpiece path. The section is substantially greatly limited by the size and arrangement of the arms. To have the time available necessary for a forming process, the ring with the workpieces has to be stopped during the forming or is allowed to turn only very slowly. The forming process can be divided into several individual forming processes, as a result of which many processing stations for processing the same point on the vial become necessary. With this device the arm has to be swung back quickly to the starting position after forming to have more time available for forming. This leads to increased mechanical stress and correspondingly to increased wear.

To enlarge the section on which the forming takes place, in a device known from DE-PS 15 96 410 the forming rollers have been placed on a conveyor device, which for the period of forming moves at the angular speed of the ring along with the workpieces and parallel to the workpieces. In this arrangement, either the workpiece to be formed or the conveyor device is stationary. To form the next workpiece during the return of the conveyor device, several conveyor devices with forming rollers have to be used, and the conveyor devices can be connected to one another, e.g., by a chain, so that, while the first conveyor device returns, another conveyor device for forming moves beside the next workpiece. In this way, each conveyor device has a processing pause of at least 100% of the forming time of a vial. By tolerances of the individual conveyor devices and of the forming rollers vial types differing somewhat from one another result corresponding to the number of conveyor devices in this device.

SUMMARY OF THE INVENTION

The object of the invention is to provide a device for the production of hollow articles from glass tubes wherein no or only short processing pauses occur making a high production rate possible. In this way, the mechanical expenditure for the processing station is as small as possible to obtain small tolerances in the finished vials. Moreover, in using the device, a vial machine processes glass tubes with different wall thicknesses or outside diameters without time-consuming modification operations or positioning operations being necessary.

A further object of the invention is to provide an improved process for the production of a vial.

Upon further study of the specification and appended claims, further objects and advantages of this invention will become apparent to those skilled in the art.

In contrast to the state of knowledge according to the prior art, the invention makes possible a mass production of uniform vials without great mechanical stress of the forming parts. The term "vial" used as follows stands for all hollow articles producible from a tube, such as, e.g., beaded rim vials, snap-on cover glasses, ampules, etc. It has been shown that by the forming roller, which can shift back and forth relative to the passing glass tube and during forming simply by a back and forth movement avoids the glass tube with rolling of the tube, the idle running times of the forming parts can be minimized and can even be completely avoided, since the forming roller toward the end of the rolling step is in the starting position for the forming of the next glass tube. This makes possible a constant rotation of the carousel with considerable speed and thus a continuous mass production of the hollow articles with a great rate of production.

A special advantage of the invention consists in the fact that the back and for the movement of the forming roller can be controlled with little expense by a microdrive and a programmable control device so that the forming parameters can easily be changed and matched to various conditions, such as, e.g., other glass tube diameters. The shifting of the forming roller takes place in a straight line so that the mechanical expenditure is particularly small.

With the device, hollow articles, such as, e.g., vials, ampules, candle lamps, etc. can be formed from glass tubes, which in rotatable holding chucks in a feed path, especially in a carousel, can be moved past the device according to the invention.

Preferably the axis of the forming roller is basically parallel to the glass tube axis, so that during the forming the forming roller is always applied at the same height on the part of the glass tube to be deformed. But if a shifting of the glass mass during forming should be desired, the forming roller can also be applied slightly slanted against the glass tube.

The forming roller device is advantageously placed stationary relative to the feed path of the holding chuck and thus mobile in a direction basically crosswise to the direction of the feed path of the holding chuck, and preferably a phase shift between the periodic back and forth movement of the forming roller and the periodic sequence of the holding chuck, moved past, is set. In this way, the change of the distance of the nearest point of the forming roller periphery of a chuck axis from this chuck axis during the relative curved movement of the forming roller around the chuck axis is possible with a simultaneous utilization up to 100% of the time of a periodic sequence as forming time.

Also a slanted positioning of the back and forth movement of the forming roller device to the direction of the feed path of the holding chuck is possible, and then at a certain angle, which especially depends on the degree of forming and the diameter of the glass tube, no phase shift between the periodic back and forth movement of the forming roller and the periodic sequence of the holding chuck, moved past, is necessary. The slanted positioning is especially advantageous with a circular feed path of the holding chuck, and then the slanted positioning can be achieved simply by a horizontal shifting of the slide rail of the forming roller from a radial of the circular path in the direction of the feed path. The extent of the shifting in this case is determined from the dimensions of the vial machine and the vials, such as the radii of the carousel, of the glass tube, of the forming roller, of the formed mouth as well as the angle of rotation of the carousel, by which the forming takes place. Preferably, the slanted positioning deviates only a few degrees from the perpendicular (crosswise) positioning, and positioning angles of 80°-90°, advantageously 85°-90°, have proved to be favorable for the forming process. The most favorable positioning angle, as described above, is 90°.

Advantageously, the holding chucks are placed on a rotary table that can be driven with a constant rotation, so that it describes a circular path, and the tube axes preferably are parallel and at the same spacing distance from one another on a cylinder jacket. With this arrangement, the individual working steps, such as introduction of the glass tubes into the machine, the individual processing steps as well as the further processing of the vial after forming of the mouth in a single, compact vial machine are possible.

Preferably the forming roller device has only a single forming roller, whose edge advantageously exhibits a profile forming the outside of the mouth section. Such a profile is also possible, e.g., with two forming rollers lying on one another, which relative to the axis of rotation of the glass tube roll at different distances on the glass tube.

Advantageously, the forming roller inside the glass tube end is supported by a forming finger that has a smaller cross section than the desired inside cross section of the glass tube end to be formed and is provided with a circular segment, which advantageously extends over at least that peripheral angle, by which the forming roller rolls engaged with the glass tube, and favorably the radius of the circular segment is equal to the radius of the desired inside cross section. Such a forming finger is not in contact over its entire periphery with the heat-softened glass and thus can again more easily be removed from the completely formed mouth.

To avoid an idle running time during the change of the forming roller between two successive holding chucks, the diameter of the forming roller is selected so that it is greater than the spacing distance between the holding chucks, reduced by the minimal processable glass tube radius and in addition reduced by the minimal mouth radius. In this way, with all usable glass tube and mouth diameters an uninterrupted forming is possible. Advantageously a diameter of the forming roller is selected, which is 30% to 100% greater than the spacing distance between the holding chucks, reduced by the minimal processable glass tube radius and reduced by the minimal mouth radius, by which a favorable characteristic of the back and forth movement of the forming roller with practically all usable glass tube diameters results.

The forming roller on the stationary support can be moved back and forth precisely on a carriage, which with a servomotor can be shifted by a guide axis continuous path control synchronously with the periodic sequence of the holding chucks moving past. This arrangement has proved particularly favorable with the required precision of the described forming.

Advantageously there is a spring action of the forming roller, e.g., on the carriage or of the entire carriage, so that the forming roller relative to the theoretical movement acts elastically against the glass tube end to be deformed. By this measure a destruction or excessive stressing of mechanical parts is avoided, if, e.g., a hard, undeformable object, such as, e.g., a glass splinter disturbs the forming of the forming roller. Depending on the hardness of such a disturbing object, the accuracy of the device according to the invention could be reduced by destruction or damage of certain mechanical components, such as, e.g., the suspension of the forming roller or the forming finger, the spring action in this case acts as safety element.

The spring action further makes possible the processing of different glass masses (caused by different glass tube qualities) in the mouth area, by which, e.g., an enlarged glass mass is distributed uniformly over the mouth area so that a somewhat larger, but still round, outside diameter results. To achieve this, the mouth area is suitably formed with spring action, and the spring is not interrupted during forming.

In a process for forming a vial from a glass tube, in which the vial is formed from one end of the glass tube, the process includes the following steps. A number of glass tubes at equal spacing distances are conveyed continuously along a feed path. One end of each glass tube is heated. A mouth is then formed by rolling the heat-softened glass tube with forming roller against a forming spike as the glass tube rotates around its longitudinal axis. The glass tube section with the formed mouth is then separated from the glass tube. A vial bottom is formed in the separated glass tube section. The advantage is achieved by the process in that the forming roller is moved back and forth relative to the feed path with the periodicity with which the glass tubes are moved past. This is because the forming roller has a reduction in the distance of its peripheral point closest to the glass tube longitudinal axis moving there past. Moreover, the longitudinal axis of the glass tube being formed is moved past the forming roller in a circular path. The forming roller with the approach of a glass tube is moved back from the feed path of the glass tube and when the glass tube moving away is again moved forward toward the feed path into the distance space between the departing and next glass tube.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
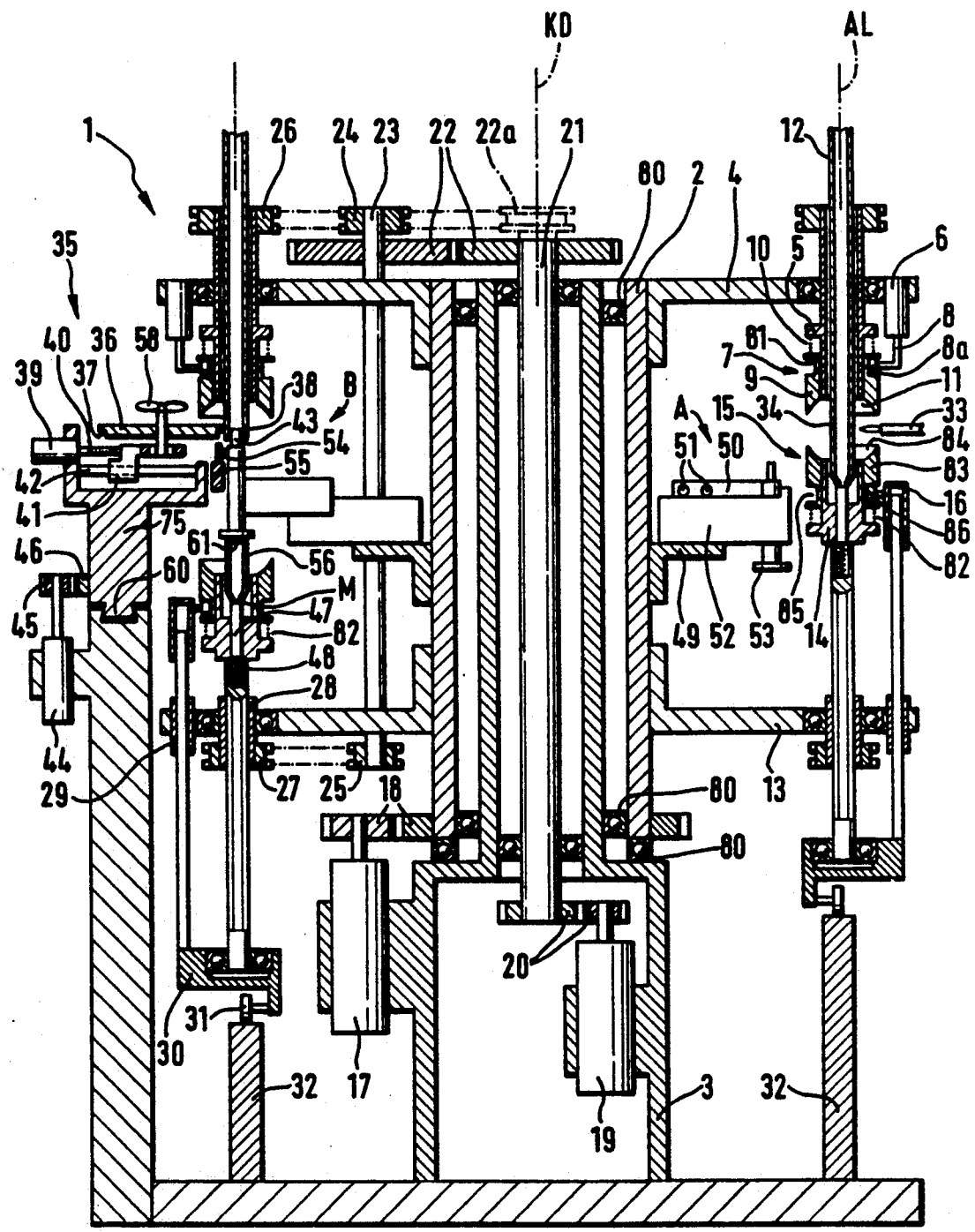
FIG. 1 shows a section through the vial machine along the carousel axis.

In forming a vial from a glass tube all processing steps are performed in a vial machine 1, which includes an upper planar member 4 and a lower planar member 13. Planar members 4 and 13 are permanently connected to one another and form a two-tiered carousel 2, which is mounted by bearings 80 on a frame 3. First receiving devices 5, rotatable around their own longitudinal axes, are fastened in uniform spacing distances on the periphery of upper planar member 4, whose lower ends exhibit one holding chuck 7 each able to be opened and closed by a pneumatic cylinder 6. In the preferred embodiment, planar element 4 has a diameter of about 80 cm (measured from the longitudinal axes AL of two receiving devices 5 opposite one another) and carries 16 receiving devices 5. The diameter of planar element 4 is preferably 60 to 120 cm, and the distance of two adjacent receiving devices 5 is favorably from 11 cm to 23 cm.

For opening the holding chuck 7, a pneumatic cylinder 6 draws a fork 8 with two rollers 8a, which run in a continuous groove 81 of a sliding sleeve 9, against spring by which sliding sleeve 9 retracts gripping jaws 11 and releases a glass tube 12. Instead of pneumatic, also, e.g., electromechanical or purely mechanical spring force controls, controlled by cams, are possible. It is decisive that the holding chucks close gently so as not to destroy the glass tube. In principle, other types of suitable chucks are suitable for holding the tubes.

Glass tubes 12 with an outside diameter of 13 mm to 50 mm and with a wall thickness of 0.5 mm to 3.0 mm are particularly suitable for processing in the vial machine 1.

Longitudinal axes AL of first receiving devices 5 run parallel to the carousel axis of rotation KD, in the represented embodiment for simplification of the design. Below each first receiving device 5 there is placed in lower planar element 13 of carousel 2 in each case a second receiving device 14, rotatable around its own longitudinal axis also with a holding chuck 15 so that the opposite first and second receiving devices or their holding chucks in each case exhibit a common longitudinal axis. Holding chucks 15 of second receiving devices 14 can be controlled by a cam (not shown), which acts from above on a cylinder 16 and by a fork with two rollers 86, which are guided in a groove 85 of a sliding sleeve 83, and in this way, as described above, opens clamping chuck 84 of holding chuck 15 against the pressure of a spring 82. Also with a holding chuck 15 pneumatic or electromagnetic operation is possible. In this case also it is necessary that the holding chuck close gently so that the glass tube end or vial, held by chuck 15, is not destroyed.

A controllable motor 17 with incremental indicator rotates carousel 2 with receiving devices 5 and 14 by a gear pair 18. For rotation of receiving devices 5 and 14 around their own axes AL a second motor 19, controllable independently of motor 17, is provided, which by a gear pair 20 (or a toothed belt drive, not represented), a tube 21 and a gear pair 22 (or directly with a chain (not represented) by a sprocket 22a) acts on a shaft 23, which on its upper and lower end includes sprockets 24 and 25, by which receiving devices 5 and 14 are driven with sprockets 26 and 27 by chains, not represented, in the same direction and with the same transmission ratio, so that upper and lower receiving devices 5 and 14 rotate with the same speed.

To allow a shifting of the second receiving device 14 in the longitudinal direction, it sits in a multiple spline hub 28, which transmits the rotary drive of sprocket 27 by frictional contact to second receiving device 14, but at the same time makes possible a free shifting of it in the longitudinal direction. For shifting the second receiving device 14 in the longitudinal direction a lifting device 30 is provided, which is shiftably placed in a guide sleeve 29 and is guided by a wheel 31 over a curve 32. Curve 32 can be made variable in its height so that the lift of second receiving device 14 can be adapted to a different working height for vials of different length.

Outside of carousel 2 under first receiving devices 5 are placed several burners 33, which heat a glass tube section 34 projecting from first receiving devices 5 brought past in rotation, to a temperature at which it can be separated from glass tube 12 by drawing. A glass tube end 38 possibly closing in this case is again opened by a fine-pointed burner 57 (FIG. 3) and again heated by another burner (not represented).

In the direction of rotation of carousel 2, these burner stations are followed by a forming station 35, which is placed on a base 75 outside carousel 2 and is used for forming a mouth M in glass tube ends 38. Forming station 35 carries a forming roller 36, which basically has the shape of a disk and can exhibit a profile 37 on its periphery for forming mouth M in glass tube end 38.

Forming roller 36 has a diameter, which is greater than the distance between two consecutive glass tubes 12 and is guided so that as constantly as possible it is in contact with a glass tube 38, i.e., forming roller 36 in practice is constantly driven by a force-driven glass tube end 38 and therefore has no interruption in rotation. As a result, only slight friction forces occur between forming roller 36 and a glass tube end 38, newly coming in contact with it, by different path speeds of the respective peripheries, since forming roller 36 has to be only slightly accelerated by new glass tube end 38. To bolster the rotation of forming roller 36, forming roller 36 can be provided with a propeller 58, by which forming roller 36 can be driven with an air current. In the represented embodiment, forming roller 36 has a diameter of about 20 cm, generally diameters of 15 cm to 28 cm are favorable.

To forming station 35 is fastened a controllable fine drive 39 with an incremental indicator, which by a threaded spindle 40 shifts carriage 41, which sits on a slide rail 42. Forming roller 36 is mounted to rotate on carriage 41 and for forming the mouth is adjusted at a suitable height to glass tube end 38.

Rotating glass tubes 12 are moved past by rotation of carousel 2 at forming station 35. In this case, forming roller 36 adapts, with a straight back and forth movement that basically runs radially with respect to carousel 2, to the circular path of rotating glass tube 12 with simultaneous rolling of glass tube end 38. A crosswise (secant) back and forth movement to carousel 2 is also possible. In this case the back and forth movement is in another phase shift with respect to the periodic sequence of holding chuck 7 moving past the forming station. Toward the end of the forming step, forming roller 36 is preferably shifted so far toward carousel axis of rotation KD that free space 36 up to next glass tube end 38 is completely filled with forming roller 36 so that the latter can immediately begin with forming next glass tube end 38.

In principle it is sufficient if forming station 35 is aligned once relative to the carousel so that the back and forth movement of forming roller 36, as described above, takes place radially to carousel 2. Forming station 35 can then be permanently connected to frame 3. But, if a crosswise back and forth movement of forming roller 36 relative to carousel 2 is to be possible, a crosswise guide 60 relative to carousel 2 is provided below on base 75 in which entire forming station 35 can be shifted in a direction crosswise to slide rail 42. This shifting can take place by hand, e.g, by a hand crank, but advantageously this takes place by a stepper motor 44, which by gear 45 acts on rack 46 and thus forming station 35 is shifted in a direction tangential to carousel 2 by a specific amount. In this case it is important that crosswise guide 60 be secured from an unintentional shifting during the forming process.

As an alternative, this crosswise (secant) back and forth movement to carousel 2 and the related phase shift to the periodic sequence of holding chuck 7 moving past can be achieved by the software of the guide axis continuous path control.

Other corresponding forming stations with other forming rollers 36b, 36c (FIG. 3) can be mounted in the direction of rotation of carousel 2, and preferably up to three forming stations are used, which advantageously roll glass tube ends 38 at different heights, by which a special configuration of the neck area of a vial or an ampule is possible.

To support glass tube end 38 during forming, a forming finger 43 is provided which can be brought into a position precisely under the center of glass tube 12 and can be inserted into glass tube end 38. Inserted forming finger 43 forms a resistance for heat-softened glass tube end 38 pressed by forming roller 36, a resistance up to which the rolling of glass tube end 38 takes place. The inside diameter of the mouth to be formed on glass tube end 38 is determined by the distance of the wall of forming finger 43, running in opposite direction to forming roller 36, from the longitudinal axis of glass tube 12. Preferably forming finger 43 has a radius of 2 mm to 50 mm.

In the vial machines known so far, one forming finger each is always allocated to a tool station or forming station, but together with the new forming station it is more favorable if each receiving device 5 has a forming finger 43 allocated to it, by which there is more time for putting forming finger 43 in and out of glass tube end 38 and forming finger 43 has enough time to cool off before the next forming process. In this case, forming finger 43 can be mounted, shiftable in height, on a horizontal carriage 50, which can be shifted back and forth on a rail 52 by rollers 51. Rail 52 is fastened to a median plane 49 of carousel 2. Forming finger 43, which sits on the front end of horizontal carriage 50, can be shifted by horizontal carriage 50 from a rest position A into the common longitudinal axis of related receiving devices 5 and 14. In this position B, forming finger 43 can be lifted into glass tube end 38 by a cam roller 54 guided by a cam 55.

Shifting of horizontal carriage 50 preferably takes place by compressed air by a pneumatic cylinder (not shown), which can be connected to horizontal carriage 50 either directly or preferably, because of the slight space available in the radial extension, by a lever arrangement (not shown).

To avoid an overheating of forming finger 43, the latter, after each forming, is removed downward from glass tube end 38, even if still other forming stations with forming rollers 36b, 36c (FIG. 3) follow, since between these forming rollers glass tube end 38 is again heated by burners (not represented).

After the last forming station completely formed glass tube end 38c (FIG. 5) is cooled below the transformation temperature of the glass and by opening of holding chuck 7 is allowed to fall on a bounce plate (not represented) corresponding to the article length adjustable in the vertical direction. After the mouth rests on the bounce plate, holding chuck 7 is again closed by cylinder 6. Then second receiving device 14, placed directly under glass tube 12, is moved upward by curve 32 to the point that completely formed mouth M of glass tube end 38 pushes a punch 47, against a spring 48, a somewhat further into second receiving device 14. For this purpose, lower holding chuck 15 is opened by cylinder 16 and, after raising by the same cylinder, is again closed to grasp the glass tube.

Glass tube section 34 with completely formed mouth M, as described above, is heated with burner 33 to the point that it can be separated downward by drawing. In separating, separated glass tube section 34 closes on its upper end with formation of a vial preform. Upper glass tube 12, as described above, is further processed and separated glass tube section 34 again moves downward in second receiving device 14. To form a bottom 61 on the vial preform the upper end of separated glass tube section 34 is again heated by a burner (not represented) and the vial preform is formed in a bottom forming step to a completed vial 56. Formation of the bottom can take place by a bottom forming station placed outside the carousel, as, e.g., DE-PS 12 61 638 describes it. But as represented in FIG. 1, the bottom formation can also take place particularly simply on horizontal carriage 50.

For this purpose, on each horizontal carriage 50 a bottom former 53 each, which normally is a carbon compact, is placed under forming finger 43. With this arrangement it is achieved that bottom former 53 by horizontal carriage 50 moves together with forming finger 43 into the common longitudinal axis of receiving devices 5 and 14, if the latter is brought for mouth formation into lower glass tube end 38. In this position of bottom former 53, the related lower receiving device 14 is moved upward by cam 32 until the bottom 61 to be formed comes in contact with bottom former 53. By the above-described rotation of second receiving device 14 a uniform bottom formation takes place, and especially with glass tubes with a sizable diameter (from about 15 mm outside diameter) advantageously by receiving device 14 supporting air is blown into the vial inside against bottom 61, so that the latter does not sag but comes in contact with the entire bottom surface with bottom former 53.

After bottom formation completely formed vial 56 is again lowered into second receiving device 14 by curve 32, so that also forming finger 43, as described above, can be removed from lower, now formed glass tube end 38c. Bottom former 53 then again moves with forming finger 43 back into its rest position A by horizontal carriage 50 in the direction of axis of rotation KD of carousel 2.

Vial 56 is then cooled. In a following station, the vial 56 is gripped by a removal gripping device in the bottom area and then released by opening and lowering of clamping jaws 84 of holding chuck 15. Empty holding chuck 15 is preferably automatically cleaned of any possible contaminations and then moved upward to receive next glass tube end 38, and the forming process begins again.

Figure 2:
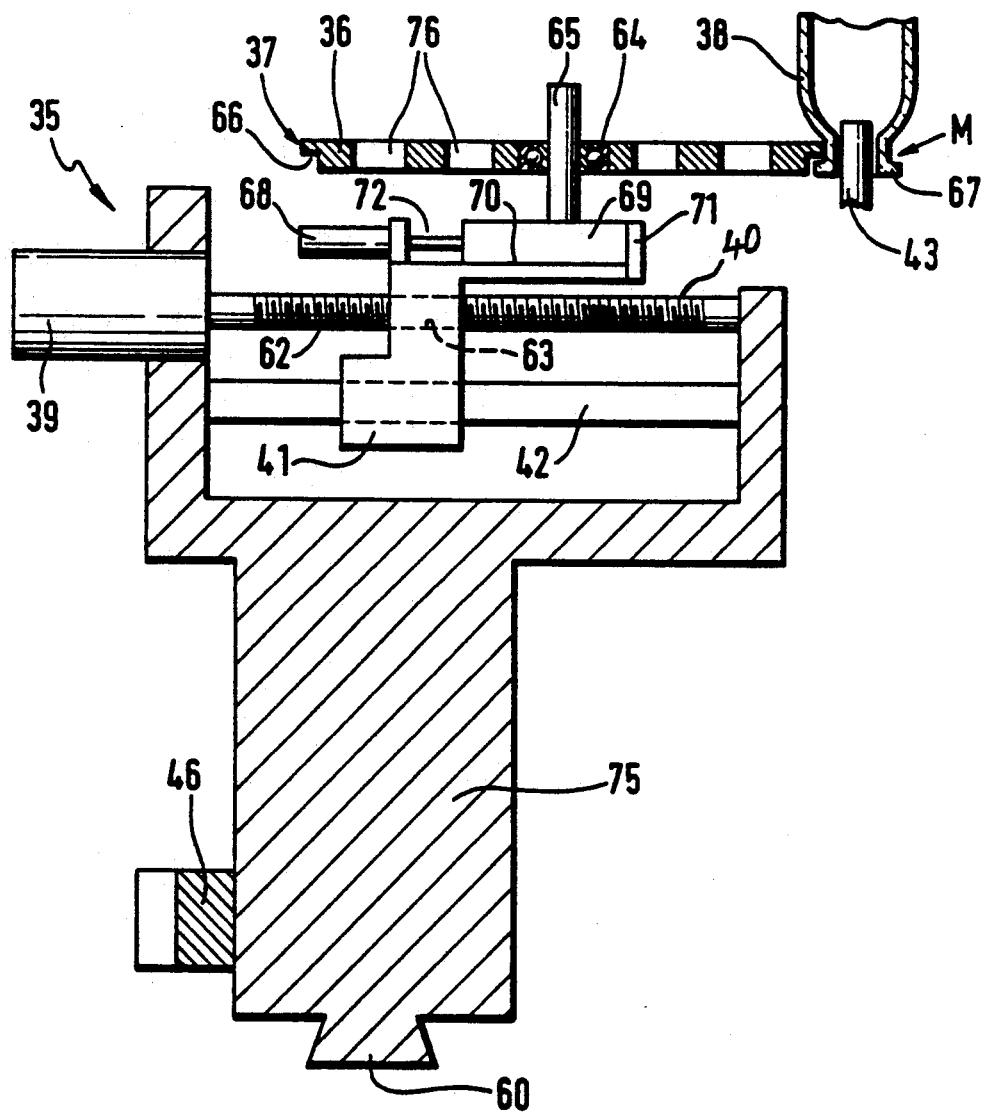
FIG. 2 shows a forming roller device in an enlarged representation.

The design of a forming station 35 with other details is represented in FIG. 2. Base 75 of the forming station at its foot has the already mentioned crosswise guide 60 and gear rod 46, by which entire forming station 35 can be shifted in a direction crosswise to the working movement of forming roller 36. By crosswise guide 60 it is possible to align the working movement of forming roller 36 accurately radially to the axis of rotation of the carousel of, if desired, to offset it parallel to the radial direction so that a crosswise direction results. Such a crosswise direction is preferably offset from the radial direction in the direction of rotation of the carousel. To base 75 are fastened microdrive 39 and slide rail 42, on which carriage 41 for forming roller 36 sits. A threaded rod 62 is provided for shifting of carriage 41. Threaded rod 62 on its one end is mounted to rotate in forming station base 75 and on its other end is directly connected to microdrive 39. Carriage 41 includes a threaded guide 63, by which threaded rod 62 is guided through. By rotation of threaded rod 62 by motor 39 carriage 41 can correspondingly be shifted back and forth along slide rail 42. Preferably slide rail 42 is designed either double or has a cross section deviating from the circular, so that a stable guiding of carriage 41 is obtained and threaded rod 62 is relieved of a lateral stress by the carriage.

For safety reasons in carriage 41 a spring action is provided, which makes possible for forming roller 36 to give way in case of too high a pressure resistance, e.g., an insufficiently heat-softened glass batch. The spring action takes place basically with a pneumatic cylinder 68, which shifts a carrier part 69 in the direction of carousel 2. In this case, carrier part 69 is held in a guide 70 in carriage 41, and a stop 71 is provided so that carrier part 69 is not shoved out of carriage 41 by cylinder 68, if no resistance is effective against forming roller 36. With too great a pressure resistance against forming roller 36 the latter can give way with carrier part 69 against cylinder 68 into a alternative space 72 so that damage of the precision parts is avoided. Another positive effect of the spring action is that forming roller 36 can adapt to fluctuating amounts of glass during the forming of the mouth area and thus even with somewhat fluctuating glass thicknesses of glass tube 12 makes possible the formation of a circular outside diameter in the mouth area. Without this spring action, the excess amounts of glass during the formation between forming finger 43 and forming roller 36 would have to be pushed away upward or downward so that also in this case a circular outside diameter is achieved.

In carrier part 69 of carriage 41 a shaft 65 is placed, on which forming roller 36 is fastened to rotate by a bearing 64. The axis of shaft 65 is advantageously placed parallel to the glass tube axes. Forming roller 36 exhibits on its edge profile 37, whose lower recess 66 forms a collar 67 on mouth M.

Forming roller 36 together with bearing 64 is adjustable in height on shaft 65 or can be exchanged for differently designed forming rollers. This is necessary to adjust the forming rollers in height relative to glass tube end 38 and to form differently configured mouth areas.

Figure 3:
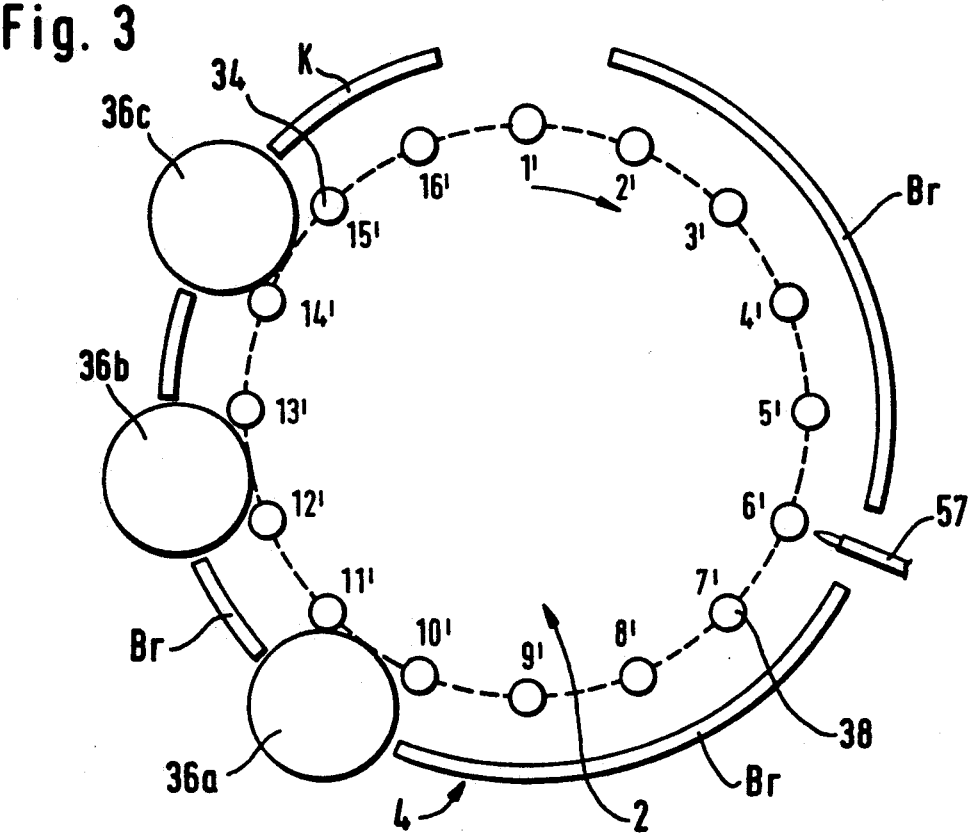
FIG. 3 shows diagrammatically individual forming steps in an upper plane of the carousel.

Advantageously forming roller 36 in its body exhibits many voids 76, which reduce the weight of the forming roller but still guarantee a satisfactory stability of forming roller 36. In this way, the inertia at different peripheral speeds between forming roller 36 and glass tube end 38 to be formed is reduced. In FIG. 3 to explain the course of a vial formation, upper plane 4 of carousel 2 from FIG. 1 is diagrammatically represented with sixteen receiving devices 5 which are identified with positions 1' to 16'. In principle, the new forming station can interact with a vial machine with any number of holding chucks 7.

Thus, for special uses, e.g. 3 to 64 holding chuck positions are conceivable, and 12 to 24 holding chuck positions are particularly favorable.

In position 1' holding chucks 7 are opened and respective glass tube 12, as described above, is allowed to fall on the bounce plate adjustable in height and then grasped by lower receiving device 14. At the same time glass tube section 34 from positions 2 to 5 are heated by burners Br to the point that in position 5' it can be separated from glass tube 12 by downward drawing of lower receiving device 14. New glass tube end 38, closing in this case, is again opened by fine-pointed burner 57 and the mouth area is heated to formation temperature up to position 10' by other burners Br. The first forming station with forming roller 36a is placed between positions 10' and 11', other forming stations follow with forming rollers 36b and 36c between positions 12' and 13' or 14' and 15'. Each forming station forms at a possibly different height on glass tube end 38 so that with the described vial machine, mouth areas, formed over a sizable longitudinal extension, such as, e.g., in ampules, can be made. Each forming roller 36 can roll a glass tube end 38 as wide as desired, and limits are set to the resulting inside diameter of the completely rolled glass tube end 38c (FIG. 5) only by the diameter of the forming finger.

Other burners Br, which keep the mouth section to be formed at formation temperature, are placed between forming rollers 36a to 36c. The completely formed mouth area is cooled along a first cooling section K in the area of positions 15' and 16' so that this area can be grasped by lower holding chuck 15 without deformation of the glass casing (position 1').

Figure 4:
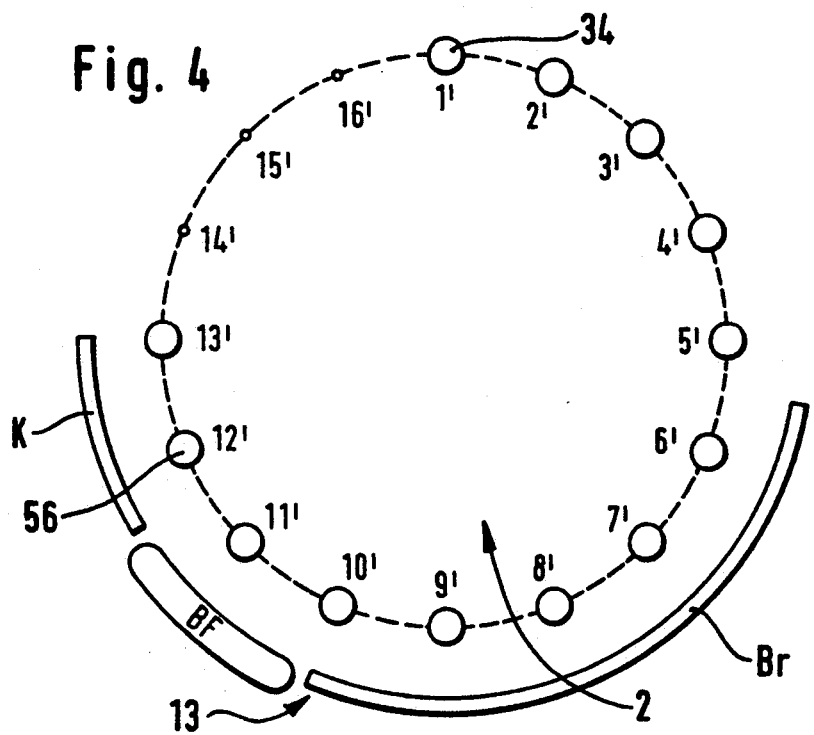
FIG. 4 shows diagrammatically individual forming steps in a lower plane of the carousel.

The completion of the forming process is explained in FIG. 4, which is to be considered together with FIG. 4, in which the sixteen positions 1' to 16' of lower receiving devices 14 of carousel 2 from FIG. 1 are represented. In positions 1' to 5' lower receiving devices 14 interact with the respective upper receiving devices 5 as described and in this case separate a vial preform in position 5' from glass tube 12. The bottom of the vial preform, closing in this case, is further heated to formation temperature up to position 10' in of burner rows Br placed on lower plane 13 of carousel 2. In position 10' lower receiving device 14 moves upward and presses the heat-softened bottom of the vial preform against bottom former 53. In this way, bottom 61 is formed up to position 11' and the completely formed vial 56 is again lowered into lower receiving device 14, so that forming finger 43 in action in upper plane 4 can again be removed from corresponding glass tube end 38.

After bottom formation BF, up to position 13 a second cooling section K follows in which finished vial 56 is cooled to below the transformation temperature of the glass, so that it is not further deformed during removal from the carousel. For removal of vial 56, lower holding chuck 15 is opened in position 13, and, as described above, the vial is removed by a gripper.

In position 15' and 16' empty holding chuck 15 is automatically cleaned of possible contaminations to receive the next mouth area.

The vial machine is not limited to the represented number of sixteen positions, advantageously eight to thirty two positions, in special cases even three to sixty four positions or more are feasible.

Figure 5:
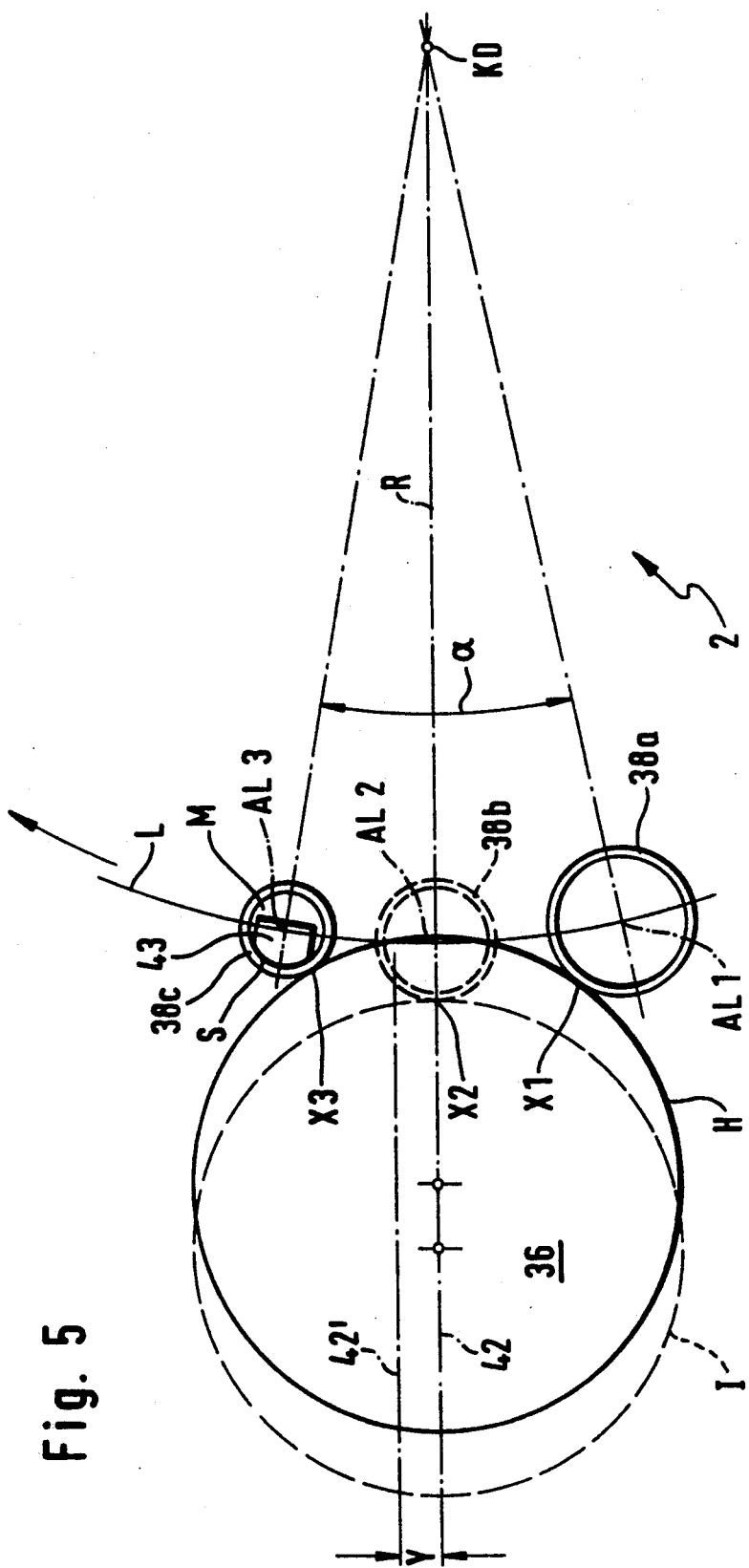
FIG. 5 shows diagrammatically the movement of the forming roller in top view.

An uninterrupted forming by forming roller 36 at an angle alpha (angle between two adjacent receiving devices) is represented in FIG. 5 (which is to be considered together with FIG. 1). In position H, drawn as a continuous line, forming roller 36 with its peripheral points X 1 and 3, closest to chuck axes AL 1 and 3 of corresponding holding chucks 7, is in contact with a completely formed mouth M of a completely rolled glass tube end 38c and a yet unformed glass tube end 38a. Since carousel 2 continuously rotates in the direction of the arrow and glass tube ends 38 in holding chucks 7 correspondingly move along on a circular feed path L, forming roller 36 has to be retracted from the carousel in a movement evading glass tube end 38a in a direction along slide rail 42 basically crosswise to feed path L. The return movement of forming roller 36 takes place to position I, drawn as broken lines, with such a speed that at the same time rotating glass tube end 38a is rolled by a certain amount. In reaching position I, peripheral point X2 of forming roller 36, closest to chuck axis AL2, has already rolled glass tube end 38b to a large extent, also a complete rolling is already possible up to this position.

For final forming, forming roller 36 again moves forward in the direction of axis of rotation KD of the carousel and thus to a certain extent follows glass tube end 38b carried further in carousel 2. In this case, forming roller 36 presses heat-softened glass tube end 38c against a circular segment S of forming finger 43, which determines the inside radius of the mouth to be formed. Circular segment S in this case is formed so that it can support heat-softened glass tube end 38 against forming roller 36 during the entire forming.

Advantageously glass tube end 38b already before reaching position H is rolled to the desired rolled diameter of mouth M, so that a certain smoothing time is available until reaching position H, in which the mouth area is no longer rolled but the rolling, that has taken place so far, is stabilized. On reaching position H, the forming process on next glass tube end 38a begins again.

Smoothing of the rolled mouth area preferably takes place over 20% to 50% of the angle, especially over 30% to 36%.

Slide rail 42' placed offset by section Y is also represented as dotted line. Shifting of the forming roller takes place in this case no longer in the direction of a radial R of carousel 2 but in the direction of a secant.

In the represented formation, there is no pause in the formation process, forming roller 36 without interruption takes over respective next glass tube end 38a. But in case of great differences between the outside diameters between glass tube end 38a and mouth M, it can be appropriate to operate with a short pause since all glass tubes 12 are driven with equal speed and correspondingly because of the different outside diameters exhibit different path speeds. In a short pause, e.g., the speed of forming roller 36 can be increased somewhat, but basically by a short pause in the range of a few milliseconds, a coupling of the different peripheral speeds of glass tube end 38a or of mouth M by forming roller 36 is avoided.

With the described processes and the vial machine high production outputs can be obtained at constant speed. Thus, for example, with the represented embodiment with 2×16 positions, production numbers for beaded edge vials of 2,000 to 5,000 units/hour are possible. Such unit numbers are not attainable with the usual processes or vial machines.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for forming vials from glass tubes wherein each vial is formed from one end of a glass tube comprising the steps of:
   conveying a number of glass tubes at equal spacing distances continuously along a feed path,
   heating one end of each glass tube to form a heat softened glass tube end,
   forming a mouth on each glass tube by rolling the heat-softened glass tube end with a forming roller against a forming finger as the glass tube rotates around its longitudinal axis,
   wherein the step for forming the mouth includes moving the forming roller back and forth relative tot he feed path in coordination with the frequency at which the glass tubes move past the forming roller, reducing the distance of a peripheral point of the forming roller closest to a longitudinal axis of the glass tube as the glass tube moves therepast in a curved manner, and moving the forming roller with eh approach of a subsequent glass tube back from the feed path of the glass tube moving away form the forming roller and then again moving the forming roller forward toward the feed path into the space between the departing glass tube and subsequent glass tube,
   separating a glass tube section from each glass tube having opposite ends with the mouth at one end of the glass tube section, and
   forming a vial bottom at the other end of the glass tube section.

2. An apparatus for deformation of end areas of glass tubes (12) which have heated glass tube ends heat softened to form mouth areas (M) of vials (56) formed from the glass tubes (12), the apparatus comprising:
   a plurality of holding chucks (7), each holding chuck (7) retaining one of a plurality of glass tubes (12) in alignment with a chuck axis (AL);
   mounting means (4) for mounting the holding chucks (7) in equal spaced relation with respect to one another to move in a direction defined by a feed path (L);
   means (57) placed proximate the feed path (L) for heating the glass tube ends (38);
   at least one forming roller station (35) having a forming roller (36) positionable against exterior surfaces of the heated glass tube ends (38);
   at least one forming finger (43), the forming finger (43) being insertable sequentially into successive ones of the glass heated tube ends (38) to provide a surface for supporting interior surfaces (67) of the heated glass tube ends (38) as the exterior surfaces (67) of the heated glass tube ends (38) are worked by the forming roller (36);
   means (75) for mounting the forming roller (36) proximate the path (L), the mounting means (75) including means (62, 41) for allowing movement of the forming roller (36) toward and away from the path (L);
   a first drive means (17) for continuously advancing the mounting means for the holding chucks (7) along the feed path (L) at a selected rate determining a selected frequency with which the glass tubes (12) pass the forming roller (36);

a second drive means (39) connected to the means for mounting the forming roller (36) for moving the forming roller (36) toward and away from the path (L) at a selected rate as the glass tubes move continuously along the feed path over a portion thereof to maintain contact between the forming roller (36) and the exterior surface (67) at a point (X) on each of the heated glass tube ends (38) as the glass tubes (12) move past the forming station (35).

3. The apparatus according to claim 2, wherein the axis of the forming roller (36) is basically parallel to the glass tube axis.

4. The apparatus according to claim 2, wherein the forming roller station (35) is placed in a stationary position relative to the feed path of the holding chuck (7) and said means for allowing movement of the forming roller toward and away from the path includes a slide rail (42) the forming roller is movable in a direction substantially crosswise to the direction of the feed path (L) of the holding chucks (7).

5. The apparatus according to claim 2, wherein the mounting means (4) for the holding chucks is a carousel and wherein each one of the chuck axes (AL) lie within a cylindrical space defined by the chucks (7) which retain the glass tubes (12).

6. The apparatus according to claim 5, wherein said first drive means comprises a motor (17) coupled to the carousel (4), which carousel is drivable by the motor (17) with constant rotation.

7. The apparatus according to claim 2, further including means for changing the distance of the point (X) with respect to the chuck axis (AL) during relative circular movement of the forming roller (36) with respect to the heated glass tube ends (38) around the chuck axis (AL).

8. The apparatus according to claim 5, wherein the said means for allowing movement of the forming roller toward and away from the path includes a slide rail (42) for mounting the forming roller (36) and further includes means (44, 46) for horizontally off-setting the slide rail (42) with respect to the radial distance (R) of the circular path (L), whereby a change of the distance of point (X) of the forming roller periphery with respect to the chuck axis occurs.

9. The apparatus according to claim 2, wherein a single forming roller per forming roller station is provided.

10. The apparatus according to claim 2, including means for mounting the forming finger (43) to cooperate with the forming roller (36), wherein the forming finger (43) has a smaller cross section than a desired inside cross section of a completely rolled glass tube end (38c) to be formed, and wherein the forming finger (43) is provided with a circular segment (S) which extends in juxtaposition with a peripheral angle by which the forming roller (36) rolls when engaged with the glass tube end (38), the radius of the circular segment (S) being equal to the radius of the desired inside cross section.

11. The apparatus according to claim 2, wherein the forming roller (36) has a diameter which is greater than the spacing distance between the holding chucks (7).

12. The apparatus according to claim 11, wherein the diameter of the forming roller is 30% to 100% greater than the spacing distance between the holding chucks.

13. The apparatus according to claim 2, wherein the mounting means (75) for the forming roller includes a carriage (41) provided for reciprocating the forming roller (36) and wherein the second drive means is a servomotor (39) which shifts the carriage (41) along a guide axis under continuous path control synchronous with the selected frequency of continuous advancement with which the holding chucks (7) move past the forming roller station (35).

14. The apparatus according to claim 13, including a pneumatic cylinder (68) mounted on the carriage for holding the forming roller (36) elastically against the glass tube end (38) to be deformed.

15. A device for deformation of the end area of a glass tube-softened on its end, especially for forming the mouth area of vials to be produced from glass tubes comprising:

a number of rotatable holding chucks spaced from one another at equal spacing distances for receiving glass tubes, means for mounting the rotatable holding chucks for motion over a path of a selected radius about a center point, means placed on the path for heating the glass tube ends projecting from the holding chucks, at least one forming roller device, of which at least one forming roller is mounted to rotate around an axis and be positioned against a softened glass tube end, a forming spike interacting with the forming roller device during the forming as a countertool and being insertable in the open end of a glass tube, first advancing means for continuously advancing the mounting means for the rotatable holding chucks along the circular path in proximity with the forming roller at a selected rate to establish a selected frequency with which the individual holding chucks move past the forming roller, second advancing means for advancing the forming roller toward and away from the center point of the path along a path parallel to a radius of the path of the rotatable holding chucks, said second advancing means being controllable to move in coordination with the first advancing means, whereby the forming roller engages each softened glass tube at a first position upstream of the radius and moves away from the center point to a second position when the axis of rotation of the rotatable holding chuck approaches the arius and then back toward the center point as the glass tube approaches a third position at which engagement between the forming roller and the glass tube ceases.

16. The apparatus of claim 15, wherein the diameter of the forming roller is greater than the equal spacing distances between the holding chucks, whereby the forming roller engages an adjacent glass tube at the first position upon disengaging from the glass tube at the third position.

* * * * *